(12) United States Patent
Hadorn et al.

(10) Patent No.: US 9,721,616 B2
(45) Date of Patent: Aug. 1, 2017

(54) PLAYBACK OF CONTENT PRE-DELIVERED TO A USER DEVICE

(71) Applicant: Opanga Networks, Inc., Seattle, WA (US)

(72) Inventors: Ben Hadorn, Seattle, WA (US); John Burnette, Seattle, WA (US); Robert Burnette, Seattle, WA (US); Carlos Gonzales, Seattle, WA (US); Jeff Harrang, Seattle, WA (US); Michelle Miller, Seattle, WA (US); Linh Nguyen, Seattle, WA (US); Ethan Nordness, Seattle, WA (US); Giles Westerfield, Seattle, WA (US); Sean Brown, Seattle, WA (US); Dave Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 0 days.

(21) Appl. No.: 14/630,417

(22) Filed: Feb. 24, 2015

(65) Prior Publication Data

US 2015/0243329 A1    Aug. 27, 2015

Related U.S. Application Data

(60) Provisional application No. 61/943,529, filed on Feb. 24, 2014, provisional application No. 61/968,235, (Continued)

(51) Int. Cl.
*H04N 9/80* (2006.01)
*G11B 27/34* (2006.01)
(Continued)

(52) U.S. Cl.
CPC .............. *G11B 27/34* (2013.01); *G11B 27/36* (2013.01); *H04N 21/26258* (2013.01);
(Continued)

(58) Field of Classification Search
CPC ......... H04N 21/44209; H04N 21/8455; H04N 21/4331; H04N 21/4334; H04N 21/4825;
(Continued)

(56) References Cited

U.S. PATENT DOCUMENTS

| 2006/0073810 A1 | 4/2006 | Pyhalammi et al. |
| 2007/0094274 A1* | 4/2007 | Jung ................. G06F 17/30749 |
| 2008/0139189 A1* | 6/2008 | Hyatt .................. H04L 67/2852 |
| | | 455/418 |

FOREIGN PATENT DOCUMENTS

| KR | 10-2008-0019972 A | 3/2008 |
| KR | 10-2009-0076161 A | 7/2009 |

OTHER PUBLICATIONS

English Translation of Korean Publication 10-2009-0076161, Jul. 2009.*

(Continued)

*Primary Examiner* — William Tran

(57) ABSTRACT

Systems and methods for displaying content pre-delivered to a user device, playing back content pre-delivered to a user device, and/or pre-delivering content to a user device during concurrent content playback, are described. In some embodiments, the systems and methods include or interact with a mobile application that displays descriptions of content available for playback via the mobile application along with indicators that represent a state of delivery (e.g., a state of pre-delivery) for the content items.

18 Claims, 10 Drawing Sheets

Related U.S. Application Data filed on Mar. 20, 2014, provisional application No. 61/976,373, filed on Apr. 7, 2014.

(51) Int. Cl.
*G11B 27/36* (2006.01)
*H04N 21/262* (2011.01)
*H04N 21/433* (2011.01)
*H04N 21/482* (2011.01)
*H04N 21/845* (2011.01)
*H04N 21/442* (2011.01)

(52) U.S. Cl.
CPC ..... *H04N 21/4331* (2013.01); *H04N 21/4334* (2013.01); *H04N 21/44209* (2013.01); *H04N 21/4825* (2013.01); *H04N 21/8455* (2013.01)

(58) Field of Classification Search
CPC ... H04N 21/26258; G11B 27/34; G11B 27/36
USPC ........................................................ 386/241
See application file for complete search history.

(56) References Cited

OTHER PUBLICATIONS

English Translation of Korean Publication 10-2008-0019972, Mar. 2008.*
Athena Vakali et al., "Content delivery networks:status and trends", Internet Computing, Dec. 31, 2003, pp. 68-74, vol. 7, Issue 6, IEEE.
International Search Report and Written Opinion for PCT/US2015/017363, mailed on May 29, 2015.

* cited by examiner

PLAYBACK OF CONTENT PRE-DELIVERED TO A USER DEVICE

CROSS-REFERENCES TO RELATED APPLICATIONS

This application claims priority to U.S. Provisional Application Nos. 61/943,529, filed on Feb. 24, 2014; 61/968,235, filed on Mar. 20, 2014; and 61/976,373, filed on Apr. 7, 2014, which are hereby incorporated by reference in their entirety.

BACKGROUND

Many user devices include and support a varied suite of mobile applications, or "apps," enabling users to download and install many different applications to their user devices. The different applications, some of which include components configured to present content to users, may have different or custom online content interfaces and retrieval/delivery protocols. Additionally, the applications may request for and receive content (e.g., video content, audio content, and so on) from various different online, networked, and/or remote content sources, such as content delivery networks (CDNs), remote content servers, remote content storage sites, and so on.

Content is often delivered from remote content servers or associated edge caches to requesting devices (e.g., mobile or other user devices) over a network. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

Often, the delivery of content to a user device from a remote content source is less than optimal, especially when the user wishes to immediately consume the content. For example, the delivery of content from a remote server to a user device may be slow or ineffective due to limitations at the content source, in the delivery network, and so on.

SUMMARY

Systems and methods for displaying content pre-delivered to a user device, playing back content pre-delivered to a user device, and/or pre-delivering content to a user device during concurrent content playback, are described.

In some embodiments, the systems and methods identify content items available for presentation by a mobile application resident on a user device, determine a state of delivery of the content items available for presentation via the mobile application, and cause the mobile application to display, along with description information for the content items available for presentation by the mobile application, an indicator associated with the determined state of delivery of the content items available for presentation. For example, the state of delivery may be a state of pre-delivery, such that the state of delivery indicates the content is pre-delivered to a local cache of the user device in anticipation of selection by a user of the user device and/or has not been pre-delivered to the local cache of the user device.

In some embodiments, the systems and methods pre-deliver content to a user device by accessing information associated with a content item currently being played back to a user by a mobile application of a user device, identifying other content items associated with the content item currently being played back to the user by the mobile application and available for playback by the mobile application, and causing at least partial pre-delivery, to a local cache of the user device, of the identified other content items associated with the content item currently being played back to the user by the mobile application.

In some embodiments, the systems and methods pre-deliver content to a user device during a concurrent playback of other content by a mobile application of the user device by identifying a state of delivery of a first content item currently being played back by a mobile application of the user device, identifying a state of delivery of a second content item currently being pre-delivered to the user device for later playback by the mobile application, and prioritizing the delivery of the second content item to the user device when a delivery progress value for the first content item exceeds a threshold delivery progress value associated with prioritizing pre-delivery of content to the user device during playback of content by the mobile application of the user device.

DETAILED DESCRIPTION

Figure 1:
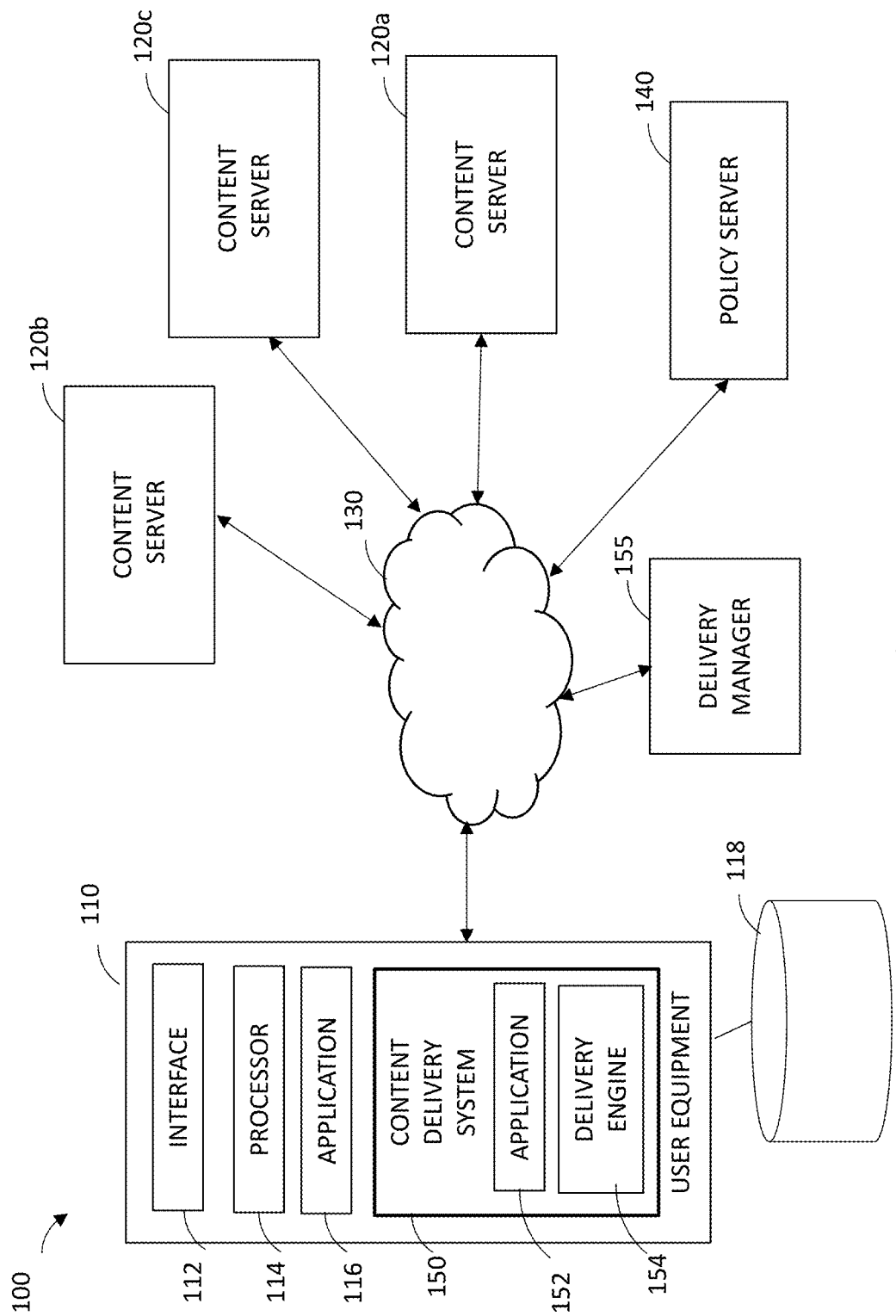
FIG. 1 is a block diagram illustrating a suitable computing environment.

Systems and methods for displaying content pre-delivered to a user device, playing back content pre-delivered to a user device, and/or pre-delivering content to a user device during concurrent content playback, are described. In some embodiments, the systems and methods include or interact with a mobile application that displays descriptions of content available for playback via the mobile application along with indicators that represent a state of delivery (e.g., a state of pre-delivery) for the content items.

The pre-delivery of content may include a delivery or transfer of content items from a remote content server to a user device before a user selects or identifies the content items for playback (or, before the user launches an application associated with the content items). Pre-delivery, therefore, may be the autonomous delivery of certain content items in advance and in anticipation of an application receiving a request from a user to playback the content items via the application.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 is a block diagram illustrating a suitable network environment 100 for the delivery of content to user devices, such as the pre-delivery or anticipated delivery of content to user devices via one or more resident mobile applications. The network environment 100 includes one or more user equipment or user devices 110, one or more content servers 120*a-c*, and a policy server 140 that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

The content servers 120*a-c* may provide a variety of different media and other content types, such as video content (e.g., movies, television shows, news programming, video clips), image content (e.g., image or picture slideshows), audio content (e.g., radio programming, music, podcasts), and so on. The content servers 120*a-c* may deliver, transfer, transport, and/or otherwise provide media files and other content to network edge caches (not shown), which may deliver, transfer, transport, and/or otherwise provide the content to requesting devices (e.g., user equipment 110*a-c*) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110 may include various types of user devices, such as mobile devices (e.g., laptops, smart phones, tablet computers, and so on), computing devices, set-top boxes, vehicle computing devices, gaming devices, and so on. The user equipment 110*a-c* may support and run various different operating systems, such as Microsoft® Windows®, Mac OS®, Google® Chrome®, Linux®, Unix®, or any other mobile operating system, including Symbian®, Palm®, Windows Mobile®, Google® Android®, Mobile Linux®, and so on.

The user equipment 110 may also support various components configured to request, receive, display, and/or present content to users associated with the user equipment 110. For example, the user equipment 110 may include applications 116, such as an app, browser, or other component that sends requests for content to content servers 120*a-c* and presents received content to the users via various display or presentation components, such as a user interface 112. The user equipment 110 may also include a processor 114 and local storage or caches 118, such as a local cache or data store that stores received content (e.g., pre-delivered or device cached content) and provides the stored content to the requesting applications 112. A local cache or storage 118 may be, for example, a storage or memory component contained by the user equipment 110, a detachable storage component that may be attached to the user equipment 110, a storage device associated with a local access network (LAN) that includes the user equipment 110, and/or other storage locations or devices that store media, files, and other data for the user equipment 110 (e.g., a storage location or device that provides storage and is accessible only by a certain or associated user equipment 110).

In some embodiments, the user equipment 110 includes a content playback system 150 that includes components configured to select and cause delivery (e.g., pre-delivery) of certain content items, such as content items identified via information (e.g., a manifest file) provided by the policy server 140, which stores information associated with mobile applications, content sources, and available content, and provides a customized manifest file to the user equipment 110 that is based on the custom configuration of the applications resident on the user equipment 110. The content playback system 150 may select a subset of the identified content items based on a variety of factors, such as previous usage of the user equipment 110 and/or the applications 116 resident on the user equipment 110, and cause the delivery of content items (or, portions of content items) of the selected subset to the user equipment 110.

Further details regarding the discovery of available content and/or pre-delivery of content may be found in commonly-assigned and co-pending U.S. patent application Ser. No. 14/335,826, filed on Jul. 18, 2014, entitled CONTENT SOURCE DISCOVERY, commonly-assigned and co-pending U.S. patent application Ser. No. 14/212,934, filed on Mar. 14, 2014, entitled PRE-DELIVERY OF CONTENT TO DEVICES, and commonly-assigned and co-pending U.S. patent application Ser. No. 14/448,876, filed on Jul. 31, 2014, entitled PRE-DELIVERY OF CONTENT TO A USER DEVICE, which are hereby incorporated by reference in their entirety.

In some embodiments, the content playback system 150 includes, provides, and/or supports an application 152, such as an application configured to receive pre-delivered content, provide information about the content and a state of pre-delivery of the content, and playback pre-delivery and other delivered content items, such as videos content, audio content, and so on.

In some embodiments, the content playback system 150 includes a delivery engine 154 that causes the pre-delivery of content to the user equipment 110 based on a variety of factors. For example, the delivery engine 154 may include components configured to pre-deliver, partially or completely, content items associated with (e.g., sharing characteristics with) content currently being played back and/or components configured to pre-deliver content items, partially or completely, content items concurrently during playback of another content item by the mobile application 116 or 152. Although FIG. 1 depicts the delivery engine 154 as part of the content playback system 150, the delivery engine 154 may also be located at network locations remote from the user device 110.

The network environment 100 may include a delivery manager 155, which directs or otherwise manages the delivery of content between devices, such as from the content servers 120a-c to the user equipment 110, from the user equipment 110 to the content servers 120a-c, between user equipment, between content servers (e.g., from content server 120b to content server 120c), and so on. The delivery manager 155 may, when instructed, track, store, and/or provide information associated with various network delivery policies and/or protocols utilized during the delivery of content over the network 130. Although the delivery manager 155 is depicted as being separate from the content servers 120a-c, any of the content servers 120a-c and/or the policy server 140 may include some or all components of the delivery manager 155. Additionally, in some configurations, the delivery manager 155 and/or the content servers 120a-c may include some or all components of the policy server 140. Also, in some embodiments, various components of and functions performed by the delivery manager 155 and/or the policy server 140 may be included in the delivery engine 154 and/or the content playback system 150.

In some embodiments, the delivery manager 155 directs or manages the delivery of content via a delivery policy that utilizes or uses surplus network bandwidth or surplus network capacity. A surplus of network bandwidth or network capacity may be network bandwidth or network capacity that is determined to be available (e.g., unused or idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth a total capacity (or, a predetermined percentage of the total capacity). Therefore, the delivery manager 155 may direct or manage the delivery of content between content providers 120a-c, network edge caches (not shown), and user equipment 110 over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

Examples User Interfaces for Playback of Content

Figure 2:
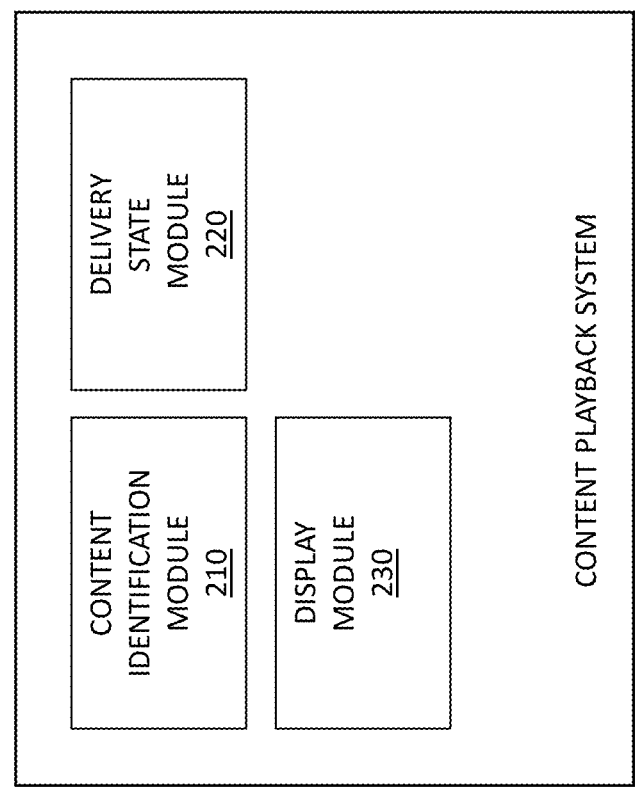
FIG. 2 is a block diagram illustrating components of a content playback system.

As described herein, in some embodiments, the content playback system 150 enables a mobile application 116 or 152 to provide a user interface that presents content available for playback along with indicators that represent a state of delivery for the available content. FIG. 2 is a block diagram illustrating the components of the content playback system 150.

The content playback system 150 may include one or more modules and/or components to perform one or more operations of the content playback system 150. The modules may be hardware, software, or a combination of hardware and software, and may be executed by one or more processors. For example, the content playback system 150 may include a content identification module 210, a delivery state module 220, and a display module 230.

In some embodiments, the content identification module 210 is configured and/or programmed to identify content items available for presentation by a mobile application resident on a user device. For example, the content identification module 210 may receive information from the policy server 140 and/or from one or more content servers 120a-c that identifies content available for presentation.

In some embodiments, the delivery state module 220 is configured and/or programmed to determine a state of delivery of the content items available for presentation via the mobile application. For example, the delivery state module 220 may determine a first content item has been pre-delivered to a local cache of the user device in anticipation of selection by a user of the user device, and determine a second content item has not been pre-delivered to the local cache of the user device.

As another example, the delivery state module 220 may determine a first content item has been partially pre-delivered to a local cache of the user device in anticipation of selection by a user of the user device, and determine a second content item has been completely pre-delivered to the local cache of the user device In some embodiments, the display module 230 is configured and/or programmed to cause the mobile application to display, along with description information for the content items available for presentation by the mobile application, an indicator associated with the determined state of delivery of the content items available for presentation.

For example, the display module 230 may display a first indicator that reflects a copy of a content item has been at least partially pre-delivered to the local cache of the user device, and display a second indicator that reflects a content item has not yet been delivered to the local cache of the user device.

As another example, for a given content item, the mobile application may display a first indicator that reflects a copy of a content item is currently being pre-delivered to the local cache of the user device, and display a second indicator for the content item when at least a partial pre-delivery of the content item to the local cache of user device is completed.

Following the example, in some embodiments, the mobile application may perform the following display actions for a content item:

displaying a playback indicator having a first color when a content item is available for immediate playback via the mobile application;

displaying the playback indicator having a second color when the content item is currently being pre-delivered to the mobile application; and displaying the playback indicator having a third color when the content item is not available for immediate playback via the mobile application and is not currently being pre-delivered to the mobile application.

In some embodiments, the displayed indicator may represent a source, rationale, and/or basis for the pre-delivery of a content item to the mobile application. For example, the mobile application may display a playback indicator having a color that represents a content item is available for immediate playback via the mobile application and was pre-delivered to the local cache of the user device based on information received from a social network profile associated with a user of the user device, based on information received from content lists created for a user of the user device within the mobile application, based on a category of content predicted to be of interest for a user of the user device, and so on.

As described herein, the content playback system 150 may perform various different methods, processes, and/or algorithms when displaying content indicators associated with content available for playback via the user device 110.

Figure 3:
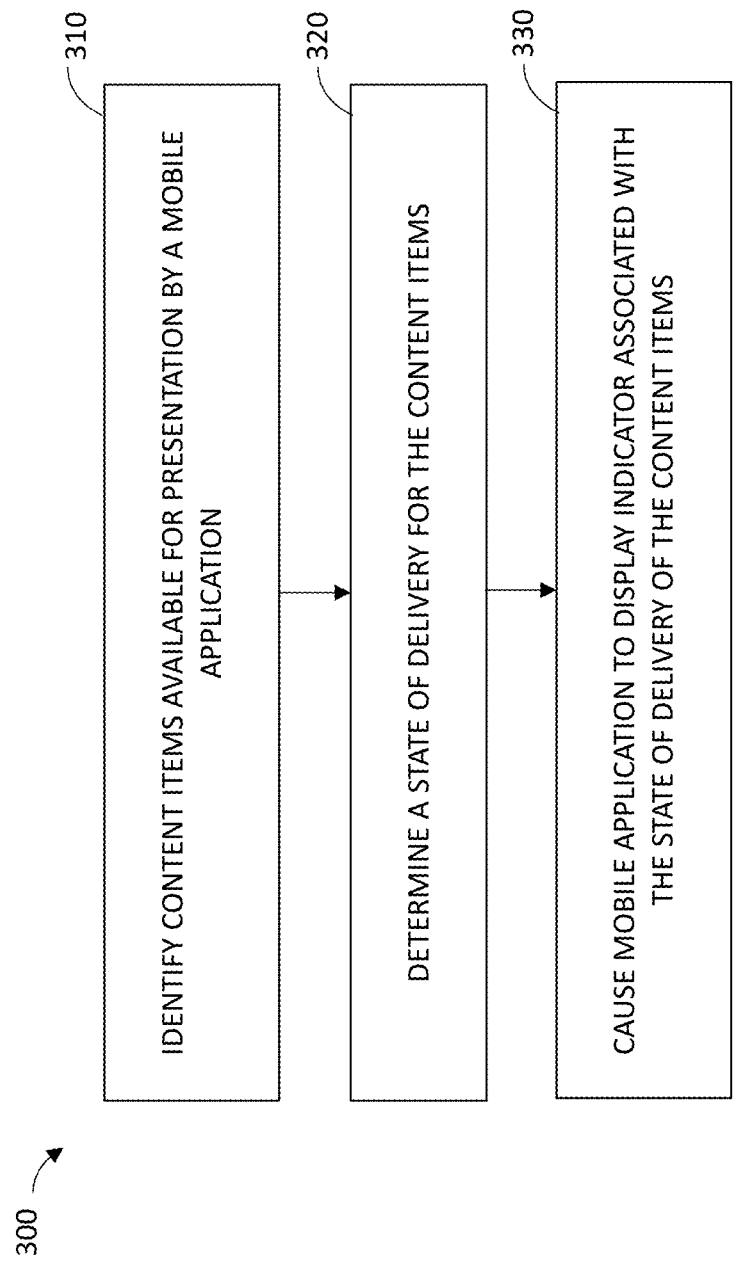
FIG. 3 is a flow diagram illustrating a method for presenting content to be played back via a mobile application.

FIG. 3 is a flow diagram illustrating a method 300 for presenting content to be played back via a mobile application. The method 300 may be performed by the content playback system 150 and, accordingly, is described herein merely by way of reference thereto. It will be appreciated that the method 300 may be performed on any suitable hardware.

In operation 310, the content playback system 150 identifies content items available for presentation by a mobile application resident on a user device. For example, the content identification module 210 may receive information from the policy server 140 and/or from one or more content servers 120a-c that identifies content available for presentation.

In operation 320, the content playback system 150 determines a state of delivery of the content items available for presentation via the mobile application. For example, the delivery state module 220 may determine a first content item has been pre-delivered to a local cache of the user device in anticipation of selection by a user of the user device, and determine a second content item has not been pre-delivered to the local cache of the user device. As another example, the delivery state module 220 may determine a first content item has been partially pre-delivered to a local cache of the user device in anticipation of selection by a user of the user device, and determine a second content item has been completely pre-delivered to the local cache of the user device In operation 330, the content playback system 150 causes the mobile application to display, along with description information for the content items available for presentation by the mobile application, an indicator associated with the determined state of delivery of the content items available for presentation.

FIGS. 4A-4G depict example user interfaces presented by a mobile application that presents content, pre-delivered or otherwise, to a user.

Figure 4C:
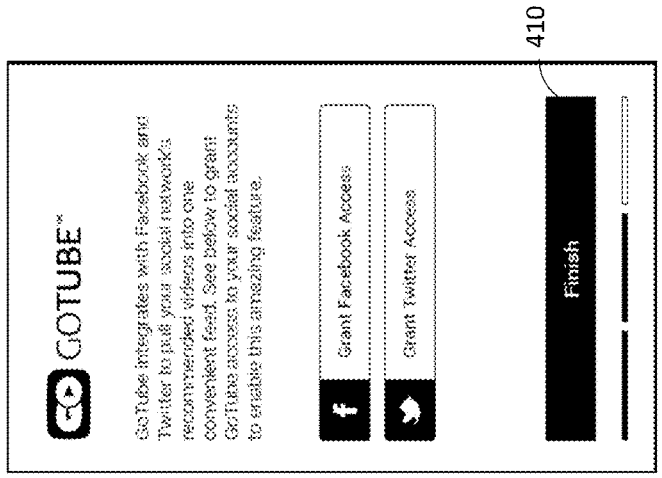
FIGS. 4A-4G are display diagrams illustrating example user interfaces presented by a mobile application that presents pre-delivered content to a user.
Figure 4B:
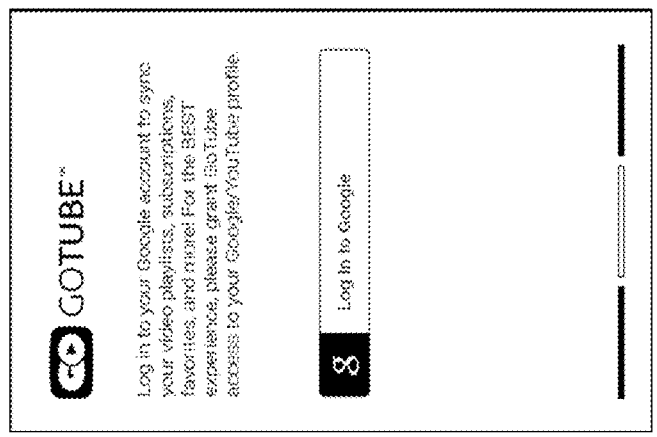
Figure 4A:
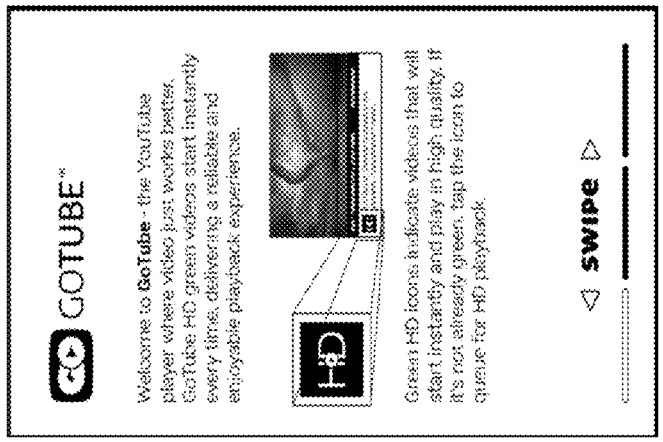

FIG. 4A depicts an initial tutorial screen that is presented after a user initially logs in and accesses the mobile application 116, 152 (e.g., represented as "GoTube" in the Figures). For example, an opening screen transitions to a second screen that instructs the user as to the meaning of a graphical icon or badge that indicates the content displaying this indicator will play with an enhanced user experience than the content without this icon. As described herein, the indicator or icon may display many different states of playback experience quality, such as a grey (ghosted) icon to indicate content with standard playback, a meta (grey/colored) icon to indicate content that is being processed for enhanced playback, and a solid colored icon to indicate content that will play with enhanced, immediate, playback (e.g., has been partially or completely pre-delivered).

FIG. 4B depicts a login screen that facilitates user login to one or more content provider accounts, such as those previously established by the user. In some cases, the user interface presents a list of content providers based on active accounts maintained by the device operating system and queried by the mobile application. The user login authorizes the mobile application to fetch content from the one or more content providers without any other explicit user action. The login screen may be auto-populated with login prompts based on the registered content provider subscriptions of the user device (e.g., the application may access an application registry of the user device in order to identify mobile applications resident on the user device).

FIG. 4C depicts a login screen that facilitates user login to one or more registered or pre-selected social networks that include the user as a member. In some cases, the user interface presents a list of social network providers presented based on active accounts maintained by the device operating system and queried by the mobile application. The user login authorizes the mobile application to fetch content and information from the one or more social networks without any other explicit user action.

A button 410 at the bottom of the screen allows the user to enter the main application. During an initial startup, the three screens (shown in FIGS. 4A-4C) are presented to the user, and when the mobile application is reduced to the background, the mobile application resumes at the last active screen, skipping the initial screens. In some cases, to reinforce this work flow, the mobile application may query the user to confirm shutdown of the mobile application before performing a shutdown process.

In some embodiments, the mobile application may provide a user interface component that enables users to input a link (e.g., www.interesting-videos.com) of a content provider or social network provider and/or may present a drop-down menu with multiple pre-configured user-selectable options to be selected by the user.

Upon receiving a user entry or selection of a link to content, the mobile application attempts to recognize the link, and when successful, prompts the user (e.g., via a pop-up window or other indication) to provide the mobile application with authorization (e.g., login credentials) to gather content from the content provider site. In cases where a link is recognized, the mobile application may access content provided by the content site based on site-specific rules or other.

Figure 4E:
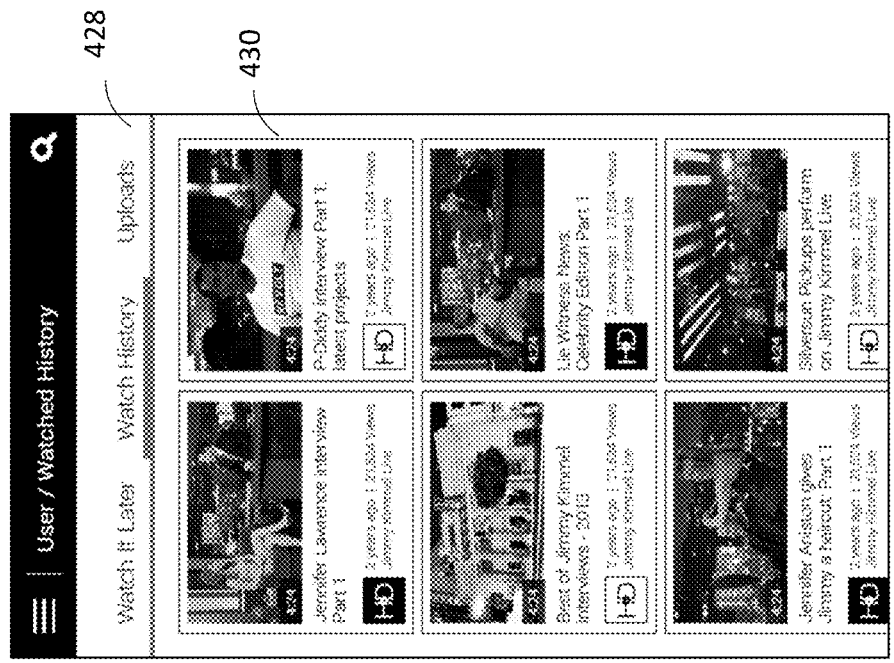
Figure 4D:
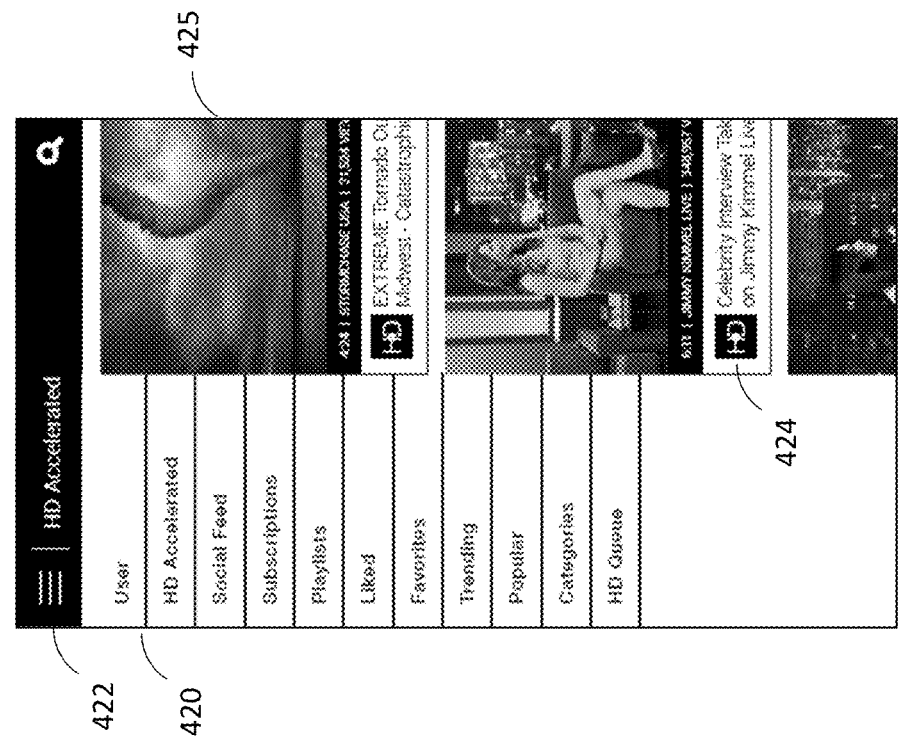

FIG. 4D depicts a presentable side menu 420 that is displayed when the user selects the menu button icon 422 on the upper left of the window (or, alternatively swipes from left edge of the screen). The side menu 420 displays a list of screens accessible to the user by touching the corresponding title for the screen. The side menu 420 is displayed along with available content items 425 and playback state indicators 424, as described herein.

FIG. 4E depicts a user screen for a logged in user. The user screen shows the name (e.g., John Smith) of the person logged in to the primary content provider network (e.g., Google), as well as sub-screens 428 available for selection, such as a "Watch It Later" screen, a "Watch History" screen, an "Uploads" screen, and so on. For example, the "Watch It Later" may include videos that have been selected for delayed viewing by a user using an external content provider application, such as YouTube®, the "Watch History" screen (depicted in FIG. 4E) may include videos 430 that have been viewed using the mobile application, and the "Uploads" screen may include videos that the user has uploaded to a content provider, such as YouTube®, or a social network. Of course, the mobile application may include additional or different sub-screens that present other aspects of the user account (e.g., usage summary information).

Figures 4F, 4G:
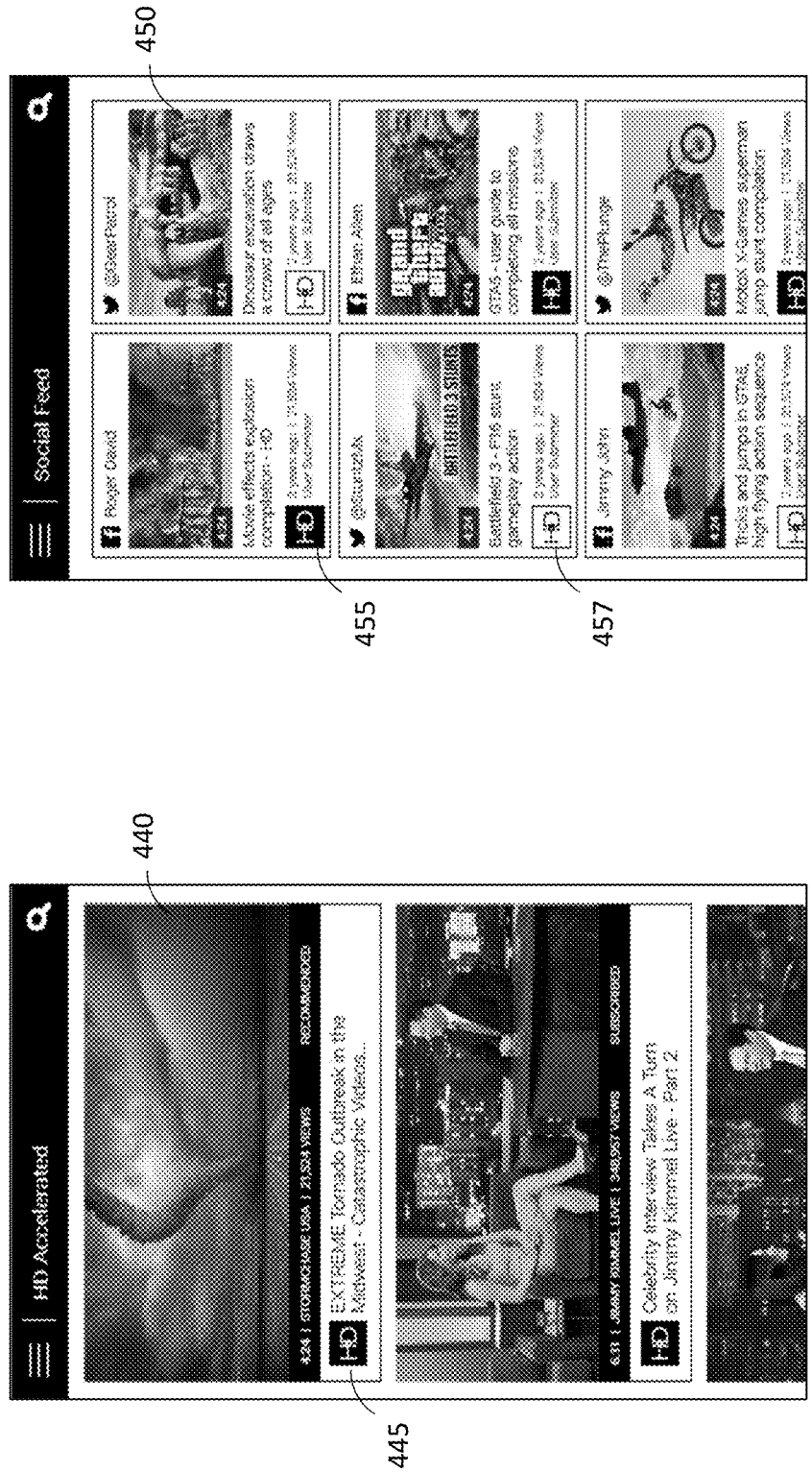

FIG. 4F depicts an HD Accelerated screen, which shows the video content items that have been pre-delivered, as described herein, for an enhanced user experience during playback (e.g., immediate playback of a displayed content item). For example, video 440 is associated with an indicator 445 that indicates the video was fractionally or partially pre-delivered into a local cache of the user device, enabling an immediate and enhanced playback experience for the user when the video 440 is selected by the user.

In some embodiments, the content playback system 150, via the delivery engine 154, may pre-deliver a fraction or initial part (e.g., 10% of a file, 2 minutes of a 30 minute file, a few initial megabytes, an intro scene, a pre-roll advertisement, and so on) of a total video file before receiving a playback request or selection by the user. The pre-delivered fraction may be sufficient to provide an immediate playback of a video when a user initiates playback, and may be sufficient to span time intervals when a network is unable to deliver content ahead of a playback rate of the content (e.g., while the remaining portion of the video is delivered after playback commences).

Pre-delivery of a partial content file obviates initial playback delays for buffering, because the beginning part of the content file is immediately available from a local cache of a user device, and may provide a fail-safe against video freezes, stalls or rebuffering delays during playback, because the playback pointer in the video file remains behind the delivered end-of-file pointer throughout playback. In some cases, the delivery engine 154 may pre-deliver a video to completion, such as cases where an offline playback event associated with the video is predicted or likely.

As depicted in FIG. 4F, the mobile application 116, 152 may decorate, display, or otherwise present videos in an "Accelerated List" with an icon or badge 445 in the lower-left corner of the video thumbnail image that provides an indication to the user that an enhanced user experience is available for the video.

Thus, the mobile application may both incentivize and guide users to seek out videos associated and available for pre-delivery. Additionally, the videos in the Accelerated list may also have a text tag added that provides a text or graphical indication of the source of the video (e.g., a text tag that includes its associated category or list, such as subscribed lists, and/or other metadata, such as popularity, poster ID or subscription ID, and so on).

For example, the mobile playback application 116, 152 may pre-deliver videos and other content based on the following determinations or scenarios:

User Choice—In many scenarios there is more content available for pre-delivery to the mobile application than can or should be pre-delivered to local storage. For example, practical limitations of on-device storage, battery life, online opportunities, service provider policy, network performance, data delivery costs and subscriptions, and so on, may introduce or cause limits to the number of videos (e.g., total number of files and/or total delivered capacity) that may be pre-delivered for the mobile application in a given time period. For example, listed content that has not been pre-delivered (e.g., on content screens) may be displayed to the user with a greyed-out (ghosted) version of the indicator icon on the video thumbnail. In some embodiments, a user may press the icon to pop-up a selector menu that triggers a process that allows the content item to be fractionally delivered to the user device. Likewise, users may manually delete content items to free local storage from pre-delivered content not of interest to the users.

Content Provider Prediction—Online content providers may use various methods to track subscribed user's interests and usage history, in order to predict other content that may be of interest to the user. Content is placed into lists by the provider (e.g., subscriptions, friends' posts, playlists, viral content, liked content, and so on). The lists may be exposed via an application programming interface (API) or web page to the mobile application, which may perform periodic collection requests, examine a user's external category lists, and/or select some or all content that a third-party service provider predicts to be of interest to the user. For example, the mobile application may selectively pre-deliver some or all of these items to the user's HD Accelerated screen. In some cases, the mobile application enables users to configure which content may be pre-delivered based on the provider prediction determination. For example, the mobile application may enable only certain lists of content to be pre-delivered. The selection to pre-deliver video may be conditional on the connection at the time of pre-delivery to a particular network type (e.g., WiFi), the network provider (e.g., "Big Broadband Communications"), the geo-location of the user device (e.g., 'not-roaming'), the time (e.g. after next billing cycle starts), and so on.

Mobile Application Prediction—By monitoring and correlating user watch history and content metadata, the mobile application may perform prediction algorithms to determine which content in available content lists is most likely to be of interest to a user. For example, the mobile application may weigh usage factors such as viewing counts, likes, or manual deletion counts associated with various metadata attributes, in order to determine relative numerical score for predicting content of interest to the user. Thus, the mobile application may select some or all of identified content of interest to the user and selectively pre-deliver content to the user device, where the pre-delivered content is indicated via the HD Accelerated screen (e.g., FIG. 4F).

In some embodiments, the mobile application enables the user to configure which content may be pre-delivered to the user device. For example, certain lists may be allowed, or other selectable criteria. The selection to pre-deliver video may be conditional on the connection at the time of pre-delivery to a particular network type (e.g., WiFi), the network provider (e.g., "Big Broadband Communications"), the geo-location of the user device (e.g., 'not-roaming'), the time (e.g. after next billing cycle starts), and so on.

As described herein, the mobile application may pre-deliver content from various different content lists, such as from external content providers and social networks. Example content lists include:

Subscriptions—Users may indicate interest in collections of related content by subscribing to a content channel (e.g., sports fishing). The subscription channels, if available to the mobile application via third-party APIs, may be used to examine content associated with those channels and select one or more content items from those lists to be fractionally pre-delivered and added to the HD Accelerated list.

Social feed—Users may belong to one or more social networks (e.g., Facebook®, Twitter®, and so on). The content posted on a user's social network page, if available to the mobile application via third-party API's, may be used to examine content lists and select one or more content items from those lists to be fractionally pre-delivered and added to the HD Accelerated list.

Playlists—Users collect and organize videos themselves using external applications and services, such as YouTube®. The lists of playlists and their content may be exposed via an application programming interface (API) to the mobile application. Content published on the playlists may be selectively added to the HD Accelerated list.

Liked—Users may tag certain videos as preferred content using external applications and services, such as YouTube®, or social networks such as Facebook®. The liked content lists and their content may be exposed via an application programming interface (API) to the mobile application. Content published on the liked content lists may be selectively added to the HD Accelerated list.

Favorites—Users may identify certain content of particular interest using external applications and services, such as YouTube®. The lists of favorites and their content may be exposed via an application programming interface (API) or web page to the mobile application. Content published on the playlists may be selectively added to the HD Accelerated list.

Trending—Content providers (e.g., YouTube®) may use various methods to track their subscribers' watch activity to identify viral content. The trending lists and their content may be exposed via an application programming interface (API) or web page to the mobile application. Content published on the trending lists may be selectively added to the HD Accelerated list.

Popular—Content providers (e.g., YouTube®) may use various methods to track their subscribers' watch activity to identify viral content. The popular lists and their content may be exposed via an application programming interface (API) or web page to the mobile application. Content published on the trending lists may be selectively added to the HD Accelerated list.

Categories—Content providers (e.g., YouTube®, Google+®) may group certain content by a list of keywords (e.g., comedy, education, entertainment, gaming, and so on). These lists and their associated grouped content may be exposed via an application programming interface (API) or web page to the mobile application. Content published on the category lists may be selectively added to the HD Accelerated list.

Thus, in some embodiment, the mobile application 116, 152 may access various content lists in order to identify and/or select content to pre-deliver to a user device.

FIG. 4G depicts a screen that presents a group of various different content items 450. Examples of the groupings may include: social feed, subscriptions, playlists, liked, favorites, trending, popular, categories, HD Queue, and so on. Each of these groupings may be presented to the user via menu sub-screen selections.

As described herein, items in each grouped list may include content that has been pre-delivered, currently being pre-delivered, or not slated for pre-delivery. For example, as described herein, the screen may present content items 450 with an image thumbnail from the video along with an icon or badge whose appearance denotes a pre-delivered item 455, a content item currently being pre-delivered (not shown), or a standard content item 457, among other indicators.

Content in grouped lists may therefore include a mixture of three possible pre-delivery states. Also, content in a given grouped list (e.g., Popular, Subscriptions, and so on) that is pre-delivered (e.g., available for immediate playback) may also appear on the HD Accelerated screen (FIG. 4D).

In some embodiments, users may press a greyed-out (ghosted) HD icon on a video item image thumbnail to pop-up a selector menu that allows the content item to be delivered and added to the HD Accelerated list. In some cases, the menu may pre-deliver video based on the connection at the time of pre-delivery to a particular network type (e.g., WiFi), the network provider (e.g., "Big Broadband Communications"), the geo-location of the user device (e.g., 'not-roaming'), the time (e.g. after next billing cycle starts), and so on.

Once a content item is selected for pre-delivery by the mobile application or other entity, its greyed-out HD icon changes appearance to indicate the pre-delivery selection, such as while retrieving the first fractional portion of the content file into local device storage. Content being pre-delivered may also appear on an HD Queue screen until it is ready for immediate playback.

In some embodiments, content not pre-delivered may be accessible to users for playback with a standard playback experience (e.g., the initial delivery of the content occurs after the user selects the content for playback. However, when the user selects a non pre-delivered video for playback, other pre-delivered ancillary or associated content, such as video advertisements, may be first played, while the user-selected video is initially delivered to the user device. Playback of associated content may allow the user device to cache a fraction of the video while the user watches the ancillary content, instead of simply displaying a wait indicator or message (e.g., a "buffering" message).

In some embodiments, when a user initially installs the mobile application and provides credentials for content providers, there will ordinarily be a delay before playback content available for delivery is identified, downloaded, and processed for playback. To provide users with content that is immediately available for playback, the mobile application may maintain a priority list of the most likely content of interest to the user, and cause such content to be pre-delivered during or soon after the mobile application is installed. For example, the mobile application may utilize the priority list to add initial content into the HD Accelerated list. In some cases, the mobile application obtains and examines the Subscriptions list and uses metadata associated with the most active/watched subscriptions, to selectively obtain recently posted few items in active subscriptions. The mobile application may first select available items for pre-delivery based on a maximum file length criteria, in order to provide the user with a varied group of videos immediately available for playback.

On initial startup while the user is providing login credentials the GoTube app may immediately begin examining the content provider content lists and meta data to have content available when the user first examines the HD Accelerated screen.

In some embodiments, a startup screen sequence may include a status message to the user informing the user that the mobile application is being prepared, and to check back later (e.g., 15 minutes) in order to allow the mobile application time to identify, download, and prepare the HD Accelerated content.

In some embodiments, the startup screen sequence may include playing a tutorial video or other introductory or advertising material distributed with the applications executable binary code, during which the mobile application has time to identify, download, and prepare HD Accelerated content.

In some embodiments, content that has been partially or fully pre-delivered may remain stored in the local cache until the storage space is to be used by other content, according to a cache storage policy maintained by the mobile application and/or the user device. The mobile application may implement the cache storage policy using business logic autonomously, or in some cases in combination with features exposed to users of the mobile application, such as a manual deletion of cached content.

In some embodiments, the mobile application allocates the total storage space for pre-delivered media files to a fixed maximum capacity. The maximum capacity may be user specified and/or determined by the mobile application business logic. Examples of a cache storage policy include deleting one or more older files to make room for one or more newer files, in order to maintain a fixed total cache size limit. The policy may further include prioritizing unwatched files over already-watched files for determining deletion a sequence.

In some embodiments, the total storage pool is logically subdivided into segments arranged by the source feed or other content metadata grouping. The storage segments may be allowed to grow or shrink in size, according to how actively content is added into them, the usage of the content, or other criteria.

In some embodiments, frequently unwatched content may be removed from device storage based on the network type or other network criteria that was used during the pre-delivery process (e.g., more aggressively purging content that was delivered via WiFi and less aggressively purging content that was delivered over mobile networks).

Examples of Pre-Delivering Content Associated with Currently Playing Content

Figure 5:
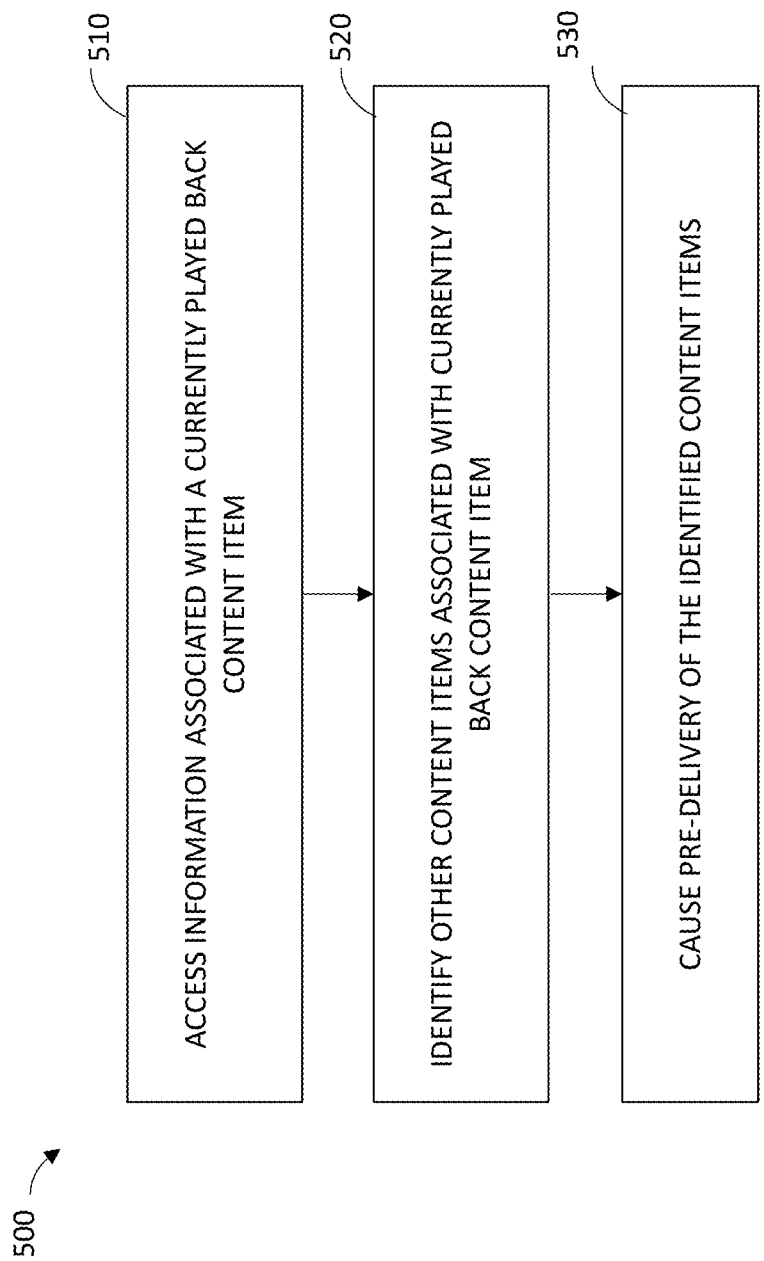
FIG. 5 is a flow diagram illustrating a method for pre-delivering content to a user device.

As described herein, in some embodiments, the systems and methods may pre-deliver content items associated with a content item currently playing within a mobile application. FIG. 5 is a flow diagram illustrating a method 500 for pre-delivering content to a user device. The method 500 may be performed by the delivery engine 154 and, accordingly, is described herein merely by way of reference thereto. It will be appreciated that the method 500 may be performed on any suitable hardware.

In operation 510, the delivery engine 154 accesses information associated with a content item currently being played back to a user by a mobile application of a user device. For example, In operation 520, the delivery engine 154 identifies other content items associated with the content item currently being played back to the user by the mobile application and available for playback by the mobile application. For example, the delivery engine 154 may identify at least one content item that is associated with a subject category that includes the content item currently being played back to the user by the mobile application, may identify at least one content item having a title that is similar to a title of the content item currently being played back to the user by the mobile application, may identify at least one content item associated with a poster identifier or publisher identifier in common with a poster identifier or publisher identifier for the content item currently being played back to the user by the mobile application, and so on.

In operation 530, the delivery engine 154 causes at least partial pre-delivery, to a local cache of the user device, of the identified other content items associated with the content item currently being played back to the user by the mobile application. For example, the delivery engine 154 may cause the pre-delivery of the identified other content items after delivery of the content item currently being played back to the user by the mobile application is completed.

In some embodiments, the delivery engine 154 may select certain content items for pre-delivery over other content items and prioritize the pre-delivery of the selected content items based on a variety of factors or rules. For example, the delivery engine 154 may identify a first other content item having a first file size, identify a second other content item having a second file size that is smaller than the first file size, and cause pre-delivery of the second other content item to the local cache of the user device before causing pre-delivery of the first other content item to the local cache of the user device.

Thus, the delivery engine 154 correlates what the user selects for playback with the user's current subject interests, which may be predictive of the content the user might select next, if offered and available for immediate playback (e.g., pre-delivered). For example, the delivery engine 154 may receive or access information describing a current video playback session, such as a video title or other metadata (e.g., subject categories, poster ID, publish date, publisher ID, play length, and so on). The delivery engine 154 correlates the current video being played with other similar or related content (e.g., in the available mobile application feeds or Hosts). When similar content is discovered or identified, the delivery engine 154 performs the methods described herein to fractionally pre-deliver one or more of the identified content files.

In some embodiments, when the list of similar content is available before the user selects a first video for playback, the mobile application may access the list to prepare a list of discovered similar content for pre-delivery when the user selects the first video. In some cases, the determination of similar or related content may depend in part or in combination with dynamic factors, including the user's location, delivery network type, time of day, proximity to commercial services, mobility, and so on.

In some embodiments, the related content list is determined based on a video that is selected and played by a user. The list is used to select related content videos when the user selects and watches the content. In some cases, the related content list may be refreshed based on the currently playing video, and not based on a sequence of related videos that led the user to watch the playing video. In such cases, the related content may change for every watched video (e.g., when the related content list is composed of videos of diverse topics).

A playback pointer refers to a content access point in the currently playing video corresponding to the scene currently being displayed to the user. A delivery pointer refers to the last received part of the content file being delivered. The pointers may refer to a particular Byte location, video frame number, time index, or other equivalent way of indexing a content file. In some playback scenarios, the delivery pointer may advance further into the file than the current playback pointer, or "get ahead" of the playback pointer. For example, the delivery of content on a high performance network might exceed the rate at which content is consumed by the media player during playback. In such scenarios, there may be opportunities (e.g., available bandwidth or buffer capacity) to pre-deliver related content before the delivery or playback completes.

In some embodiments, the pre-delivery of related content begins soon after the video currently being viewed is entirely downloaded, which, depending on the serving network speed, may often occur before the playback finishes. The delivery engine 154 may gate or restrict the attempted number of content items that are predictively pre-delivered by the average download throughput of the currently playing video, the estimated remaining playback time, and/or the size of the fractional portion of the predicted content(s).

For example, when the download for the currently playing video completes with 180 seconds of playback time remaining, and two identified related videos will utilize a combined fractional pre-cache of 3 MByte of content, and the current average download throughput exceeds roughly 140 kbps, then the delivery engine 154 may fractionally pre-deliver the two identified related videos before the currently playing video finishes. For example, when sufficient play time remains to allow for the pre-delivery of at least one related video, then the operation is allowed (otherwise it may not be attempted).

Figure 6:
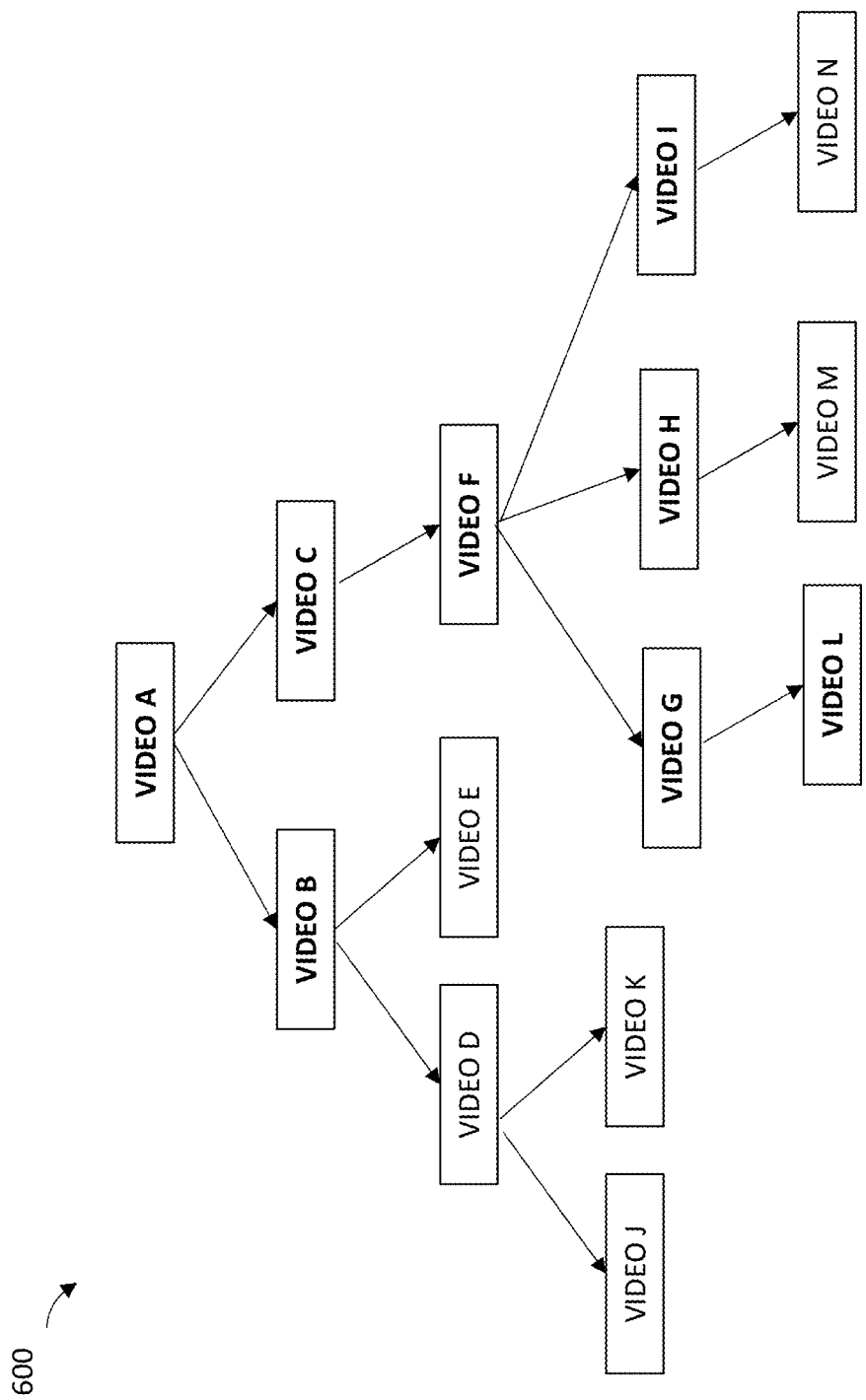
FIG. 6 is a diagram illustrating the pre-delivery of content associated with content currently being played back by a user device.

To illustrate the pre-delivery of content associated with currently playing content, FIG. 6 depicts the pre-delivery of various different content items associated with content currently being played back by a user device. For example, when a user selects Video A for playback, the delivery engine 154, utilizing the methods described herein, pre-delivers Video B and Video C, which are associated with Video A. Then, when the user selects Video C for playback, the delivery engine 154 pre-delivers Video G, Video H, and Video I. Then, when the user selects Video G, the delivery engine 154 pre-delivers Video K.

Thus, the delivery engine 154 may continuously identify and pre-deliver content for a user that is associated with content selected for playback or currently being played back to the user.

Examples of Concurrently Playing Content and Pre-Delivering Other Content

Figure 7:
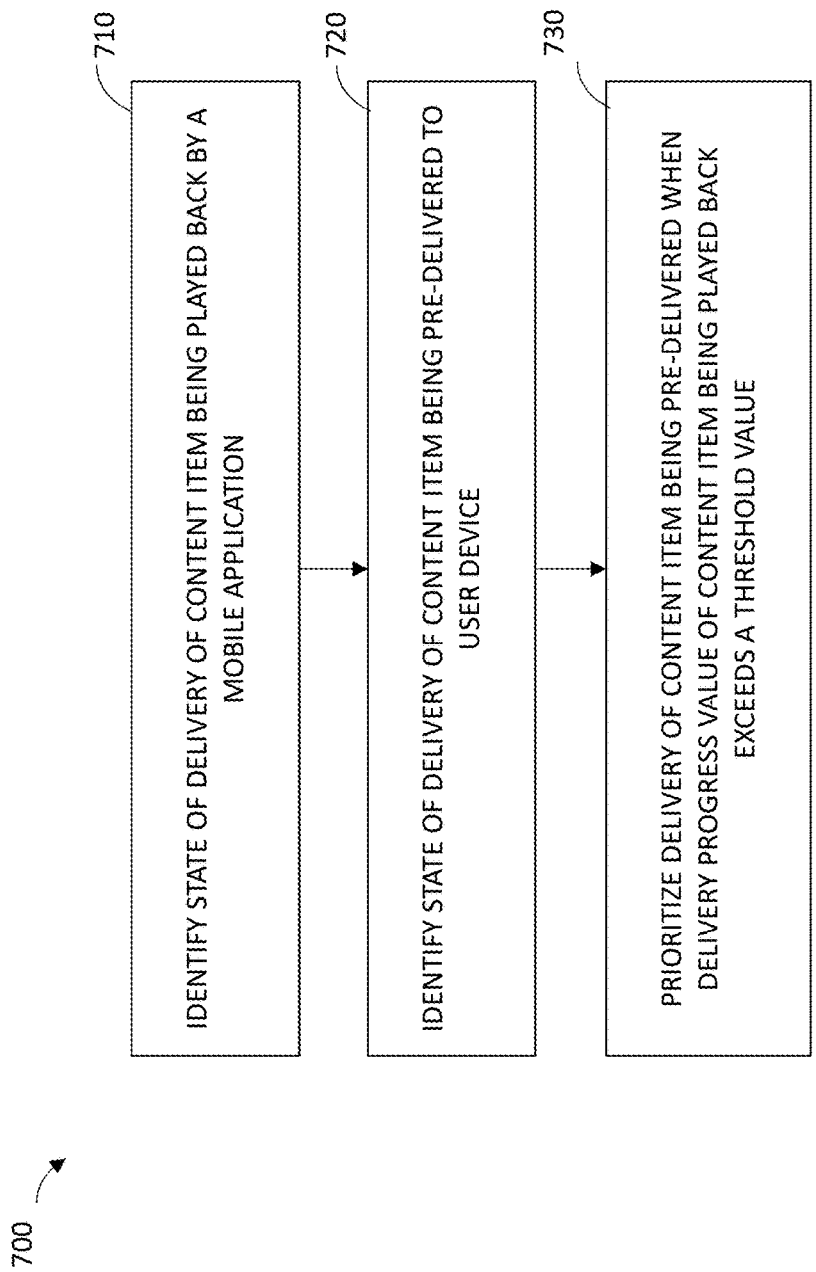
FIG. 7 is a flow diagram illustrating a method for pre-delivering content to a user device during concurrent playback of content by a mobile application.

As described herein, in some embodiments, the systems and methods may concurrently play content via a user device and pre-deliver other content to the user device. FIG. 7 is a flow diagram illustrating a method 700 for pre-delivering content to a user device during concurrent playback of content by a mobile application. The method 700 may be performed by the delivery engine 154 and, accordingly, is described herein merely by way of reference thereto. It will be appreciated that the method 700 may be performed on any suitable hardware.

In operation 710, the delivery engine 154 identifies a state of delivery of a first content item currently being played back by a mobile application of the user device. For example, the delivery engine 154 may determine the identified state of delivery of the first content item based on an average download throughput associated with the delivery of the first content item and an estimated remaining playback time associated with the playback of the first content item, and may determine the identified state of delivery of the second content item based on a predicted size of a portion of the second content item to be pre-delivered to the user device.

In operation 720, the delivery engine 154 identifies a state of delivery of a second content item currently being pre-delivered to the user device for later playback by the mobile application.

In operation 730, the delivery engine 154 prioritizes and causes the delivery of the second content item to the user device when a delivery progress value for the first content item exceeds a threshold delivery progress value associated with prioritizing pre-delivery of content to the user device during playback of content by the mobile application of the user device. For example, the delivery progress value for the first content item is a value that indicates a difference between a playback pointer associated with the playback of the content and a delivery pointer associated with the delivery of the content being played back.

For example, the delivery engine 154 may prioritize the delivery of the second content item to the user device when a difference between a playback pointer associated with the playback of the content and a delivery pointer associated with the delivery of the content being played back is increasing over time at a certain threshold rate.

In some embodiments, the delivery engine 154 may cause the delivery (e.g., pre-delivery) of the second content item while pausing delivery of the first content item currently being played back by the mobile application of the user device until the delivery progress value does not exceed the threshold delivery progress value. Once the delivery progress value is below the threshold delivery progress value, the delivery engine 154 resumes the delivery of the first content item currently being played back by the mobile application.

Thus, the delivery engine 154 may fetch or pre-delivery related content in parallel with the delivery of the content for the video being viewed (e.g., the delivery of content for the playing video and delivery of content for upcoming related videos run concurrently).

In some embodiments, the delivery engine 154 handles the concurrent pre-delivery of the related content as a lower-priority or secondary operation, with respect to the primary delivery of the currently playing content. For example, whenever the delivery pointer of the current video leads the playback pointer of that video by an index size delta (e.g., a delivery progress threshold), then the pre-delivery of one or more related videos is allowed to proceed, temporarily halting the delivery of the playing video (e.g., until the size delta shrinks to below the threshold).

In some embodiments, the delivery engine 154 may utilize the rate, or change in rate, at which the delivery pointer is advancing beyond the playback pointer when determining whether to pause delivery of the playing video and pre-deliver the related video content. For example, when the delivery pointer for the playing video exceeds the delivery pointer by a delta (e.g., a delta of 2.7 MBytes), the delivery engine 154 may consider the rate of change of the delta when determining whether to begin/end delivering the related video content.

In some embodiments, the concurrent delivery of the related content may be triggered by a user selecting a playback pause or rewind of the media player controls, playing a pre-cached advertisement, or otherwise halting the playback progress of the playback. In some cases, the halted video may continue until a sufficient buffer of content was pre-delivered, so reliable playback may be resumed. Then, the delivery of the related content may proceed until the user again resumes the playback (or, the related video content was sufficiently delivered). Abandoning, or exiting, a playing video may also cause the delivery of related videos to stop or continue.

For example, when a user abandons the video after a short time (e.g., 9 seconds) then the abandonment action may indicate a lack of interest in the video topic, and pre-delivery of related content may be disabled. However, when a user watches a suitable fraction (e.g., 50%, 80%, and so on) of a video before abandoning the playback session, the pre-delivery of related content may be continued.

In some embodiments, the delivery engine 154 may time interleave the related video delivery between multiple deliveries, or otherwise share the delivery network resources, to pre-deliver content for multiple related videos. The delivery engine 154 may interleave the pre-delivery of fractions of multiple content items at approximately the same rate so that, if the playing video were abandoned, all of the related videos will be available for immediate playback.

For example, the active transfer of content of videos A, B and C might alternate in sequence, such as deliver video A while pausing B and C, then deliver video B while pausing A and C, and so on. In some cases, the transfer job time interleave period is a pre-determined duration (e.g., 15 seconds/job) or transfer amount (e.g., 1 MByte/job, 1 video chunk, 15 seconds of video time, and so on), although the delivery engine 154 may utilize other pre-delivery scenarios.

In some embodiments, the delivery engine 154 may utilize the size of the content file or file encoding rate to determine the relative job interleaving intervals, so that larger files are given more pre-delivery opportunities, and build storage buffers of pre-delivered content. For example, if video A has a total size of 18 Mbyte, and video B has a total size of 9 Mbyte, then video A is allocated 2 MByte delivery time intervals and video B is allocated 1 MByte delivery intervals.

In some embodiments, the mobile application may present the user with new related videos to watch (e.g., in the HD Accelerated feed list) as soon as the currently playing video finishes, where the related videos having been fractionally (or fully) pre-delivered in the background while the current video was playing.

In some embodiments, the mobile application may preferentially select videos more likely to be fetched quickly (e.g., relatively shorter videos, smaller files sizes, and so on). For example, if video A is 30 MBytes and video B is only 9 MBytes and both are in a related content list, then video B is selected for acceleration before video A. In some cases, the mobile application may consider the expected likelihood that the user will be interested in a related video based on video metadata and past viewing history, in order to preferentially select videos in a related content list that are more likely to be consumed by the user.

In some embodiments, the related content may include advertising video or audio clips that are selected as the user watches a video, based in part on metadata associated with the video. The related advertising video clips are fractionally (or fully) pre-delivered in the time remaining after the currently playing video is fully delivered and playback of the video finishes. For example, the mobile application may utilize pre-delivery to allow the ads to play immediately after ("post-roll") or even during ("mid-roll") the currently playing video, and may further enable a head-end ad source to dynamically determine the relevant ads to present to the user (e.g., based on user ID, current location, serving network, and so on that correlate with their viewing preferences.

Figure 8:
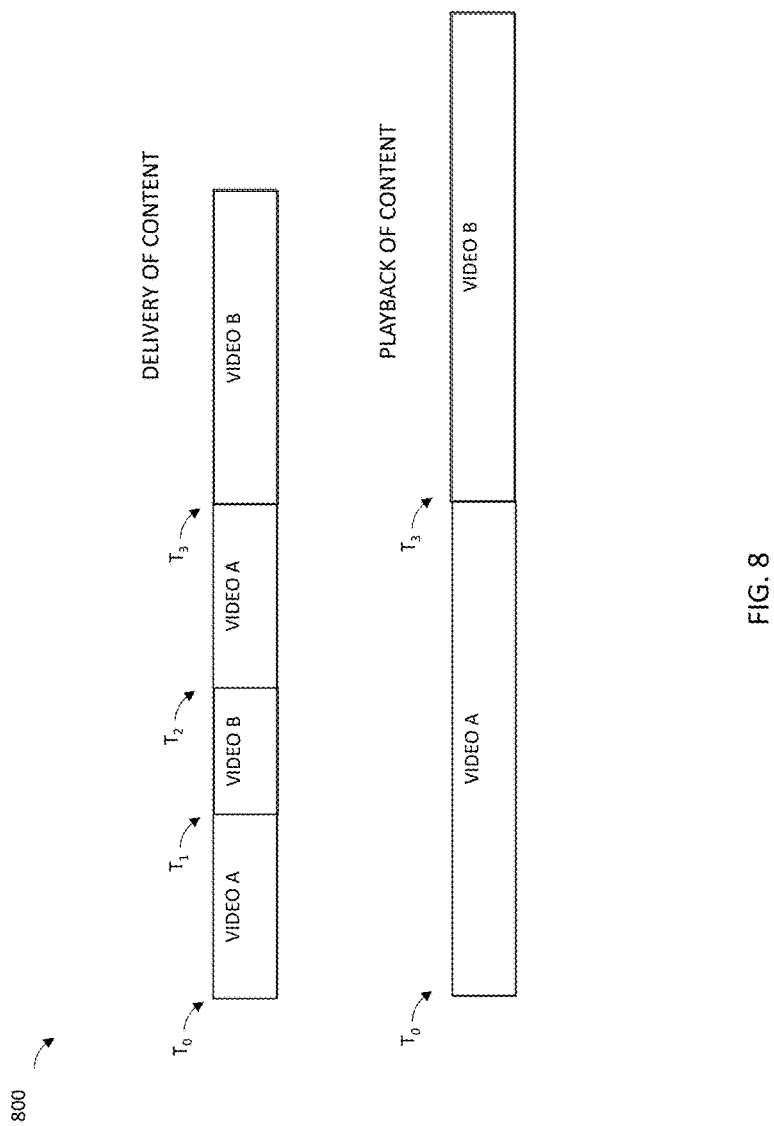
FIG. 8 is a diagram illustrating delivery and playback of a first content item concurrently with pre-delivery of a second content item.

FIG. 8 illustrates the delivery and playback of a first content item concurrently with pre-delivery of a second content item. At a time $t_0$, Video A begins delivery and playback. At a time $t_1$, the delivery progress value for Video A exceeds a threshold delivery progress value, and the delivery of Video A pauses, while a pre-delivery of Video B begins (during the playback of Video A). At a time $t_2$, the delivery progress value for Video A drops below the threshold delivery progress value, and the delivery of Video A resumes. At a time $t_3$, the playback of Video A ends, and the playback for Video B immediately begins using a partially pre-delivered fraction of Video A (delivered during the playback of Video A).

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method for pre-delivering content to a user device, the method comprising:
    accessing information describing a first video content of interest, wherein a first media file relating to the first video content of interest is being played back to a user by a mobile application of a user device;
    identifying, based on the information associated with the first video content of interest, a second video content of interest that is associated with the first video content of interest and is available for playback by the mobile application, the second video content of interest being a different content from the first video content of interest; and
    causing at least partial pre-delivery, to a local cache of the user device, of a second media file relating to the second video content of interest while the first media file is being played back to the user by the mobile application, the second media file being a different media file than the first media file, wherein causing at least partial pre-delivery of the second media file relating to the second video content of interest includes:

identifying a first second video content of interest having a first file size;

identifying a second video content of interest having a second file size that is smaller than the first file size; and causing pre-delivery of the second video content of interest to the local cache of the user device before causing pre-delivery of the first second video content of interest to the local cache of the user device.

2. The method of claim 1, wherein identifying the second video content of interest includes identifying at least one video content of interest that is associated with a subject category that includes the first video content of interest being played back to the user by the mobile application.

3. The method of claim 1, wherein identifying the second video content of interest includes identifying at least one video content of interest having a title that is similar to a title of the first video content of interest being played back to the user by the mobile application.

4. The method of claim 1, wherein identifying the second video content of interest includes identifying at least one video content of interest associated with a poster identifier or publisher identifier in common with a poster identifier or publisher identifier for the first video content of interest being played back to the user by the mobile application.

5. The method of claim 1, wherein causing at least partial pre-delivery of the second media file relating to the second video content of interest includes causing pre-delivery of the second media file after delivery of the first media file being played back to the user by the mobile application is completed.

6. The method of claim 1, further comprising:

identifying a video content of interest available for presentation by the mobile application resident of the user device;

determining a state of delivery of the video content of interest available for presentation via the mobile application; and causing the mobile application to display, along with description information for the video content of interest available for presentation by the mobile application, an indicator showing the determined state of delivery of the video content of interest available for presentation, the indicator being visible on a display area of the user device.

7. The method of claim 6, wherein determining a state of delivery of the video content of interest available for presentation via the mobile application includes determining a first video content of interest has been pre-delivered to the local cache of the user device in anticipation of selection by the user of the user device, and determining a second video content of interest has not been pre-delivered to the local cache of the user device.

8. The method of claim 6, wherein determining a state of delivery of the video content of interest available for presentation via the mobile application includes determining a first video content of interest has been partially pre-delivered to the local cache of the user device in anticipation of selection by the user of the user device, and determining a second video content of interest has been completely pre-delivered to the local cache of the user device.

9. The method of claim 6, wherein causing the mobile application to display an indicator showing the determined state of delivery of the video content of interest available for presentation includes displaying a first indicator that represents a video content of interest has been at least partially pre-delivered to the local cache of the user device, and displaying a second indicator that reflects a video content of interest has not yet been delivered to the local cache of the user device.

10. The method of claim 6, wherein causing the mobile application to display an indicator showing the determined state of delivery of the video content of interest available for presentation includes displaying a first indicator that represents a video content of interest is being pre-delivered to the local cache of the user device, and displaying a second indicator for the video content of interest when at least a partial pre-delivery of the video content of interest to the local cache of user device is completed.

11. The method of claim 6, wherein causing the mobile application to display an indicator showing the determined state of delivery of the video content of interest available for presentation includes:

displaying a playback indicator having a first color when a video content of interest is available for immediate playback via the mobile application;

displaying the playback indicator having a second color when the video content of interest is being pre-delivered to the mobile application; and displaying the playback indicator having a third color when the video content of interest is not available for immediate playback via the mobile application and is not being pre-delivered to the mobile application.

12. The method of claim 6, wherein causing the mobile application to display an indicator showing the determined state of delivery of the video content of interest available for presentation includes:

displaying a playback indicator having a color that represents a video content of interest is available for immediate playback via the mobile application and was pre-delivered to the local cache of the user device based on information received from a social network profile associated with the user of the user device.

13. The method of claim 6, wherein causing the mobile application to display an indicator showing the determined state of delivery of the video content of interest available for presentation includes:

displaying a playback indicator having a color that represents a video content of interest is available for immediate playback via the mobile application and was pre-delivered to the local cache of the user device based on information received from content lists created for the user of the user device within the mobile application.

14. The method of claim 6, wherein causing the mobile application to display an indicator showing the determined state of delivery of the video content of interest available for presentation includes:

displaying a playback indicator having a color that represents a video content of interest is available for immediate playback via the mobile application and was pre-delivered to the local cache of the user device based on a category of content predicted to be of interest for the user of the user device.

15. A method of pre-delivering a second media file relating to a second content of interest to a user device during a concurrent playback of a first media file relating to a first video content of interest by a mobile application of the user device, the method comprising:

identifying a state of delivery of the first media file being played back by the mobile application of the user device;

identifying a state of delivery of the second media file being pre-delivered to the user device for later playback by the mobile application, the second video content of interest being a different content from the first video content of interest, the second media file being a different media file than the first media file; and prioritizing the pre-delivery of the second media file to the user device when a delivery progress value for the first media file exceeds a threshold delivery progress value associated with prioritizing the delivery of the first medial file to the user device during the playback of the first media file by the mobile application of the user device, wherein prioritizing the pre-delivery of the second media file to the user device includes:

performing the pre-delivery of the second media file during the playback of the first media file while pausing the delivery of the first media file when the delivery progress value exceeds the threshold delivery progress value; and resuming the delivery of the first media file when the delivery progress value becomes below than the threshold delivery progress value.

16. The method of claim 15, wherein the delivery progress value for the first media file is a value that indicates a difference between a playback pointer associated with the playback of the first media file and a delivery pointer associated with the delivery of the first media file being played back.

17. The method of claim 15, wherein prioritizing the delivery of the second media file to the user device further includes prioritizing the pre-delivery of the second media file to the user device when the delivery progress value is increasing over time at a certain threshold rate.

18. The method of claim 15, wherein the identified state of delivery of the first media file is determined based on an average download throughput associated with the delivery of the first media file and an estimated remaining playback time associated with the playback of the first media file, and wherein the identified state of delivery of the second media file is determined based on a predicted size of a portion of the second media file to be pre-delivered to the user device.

* * * * *